US011580061B2

United States Patent
Strogov et al.

(10) Patent No.: US 11,580,061 B2
(45) Date of Patent: Feb. 14, 2023

(54) SYSTEM AND METHOD FOR FILE ARCHIVING USING MACHINE LEARNING

(71) Applicant: Acronis International GmbH, Schaffhausen (CH)

(72) Inventors: Vladimir Strogov, Moscow (RU); Vyacheslav Levchenko, St. Petersburg (RU); Stanislav Protasov, Moscow (RU); Serguei Beloussov, Costa Del Sol (SG); Sergey Ulasen, St. Petersburg (RU)

(73) Assignee: Acronis International GmbH, Schaffhausen (CH)

( * ) Notice: Subject to any disclaimer, the term of this patent is extended or adjusted under 35 U.S.C. 154(b) by 453 days.

(21) Appl. No.: 16/002,122

(22) Filed: Jun. 7, 2018

(65) Prior Publication Data

US 2018/0357246 A1    Dec. 13, 2018

Related U.S. Application Data

(60) Provisional application No. 62/516,273, filed on Jun. 7, 2017.

(51) Int. Cl.
  *G06F 16/11* (2019.01)
  *G06N 5/02* (2006.01)
  *G06N 20/00* (2019.01)
  *G06N 5/025* (2023.01)

(52) U.S. Cl.
  CPC .......... *G06F 16/113* (2019.01); *G06N 5/025* (2013.01); *G06N 20/00* (2019.01)

(58) Field of Classification Search
  CPC ....... G06F 16/113; G06N 5/025; G06N 20/00
  USPC ......................................................... 707/667
  See application file for complete search history.

(56) References Cited

U.S. PATENT DOCUMENTS

| 10,318,882 | B2* | 6/2019 | Brueckner | ............. H04L 67/10 |
| 10,389,810 | B2* | 8/2019 | Swallow | ............. H04L 67/1095 |
| 2007/0271303 | A1* | 11/2007 | Menendez | ............ G06F 40/197 |
| 2009/0313297 | A1* | 12/2009 | Hsu | .......... G06F 16/40 |
| 2015/0046881 | A1* | 2/2015 | V | ............ G06Q 10/06 715/853 |
| 2015/0310031 | A1* | 10/2015 | Kilpatrick | ............ G06F 16/182 707/748 |
| 2017/0178027 | A1* | 6/2017 | Duggan | .................. G06F 9/50 |
| 2018/0107838 | A1* | 4/2018 | Amarendran | ....... G06F 21/6245 |
| 2018/0174057 | A1* | 6/2018 | Citriniti | ................ G06Q 10/04 |
| 2018/0276256 | A1* | 9/2018 | Sarkar | .................. G06N 20/00 |

* cited by examiner

*Primary Examiner* — Hosain T Alam
*Assistant Examiner* — Saba Ahmed
(74) *Attorney, Agent, or Firm* — ArentFox Schiff LLP; Michael Fainberg

(57) ABSTRACT

Methods for file archiving using machine learning are disclosed herein. An exemplary method comprises archiving a first file of a plurality of files from a storage server to a tiered storage system, training a machine learning module based on file access operations for the plurality of files, determining one or more rules for predicting access to the archived files using the machine learning module, determining a prediction of access of the archived file based on the one or more rules and retrieving the archived file from the tiered storage system into a file cache in the storage server based on the prediction of access.

17 Claims, 5 Drawing Sheets

SYSTEM AND METHOD FOR FILE ARCHIVING USING MACHINE LEARNING

CROSS-REFERENCE TO RELATED APPLICATIONS

The present application claims the benefit of priority of U.S. Provisional Application No. 62/516,273 filed on Jun. 7, 2017, which is herein incorporated by reference in its entirety.

FIELD OF TECHNOLOGY

The present disclosure relates generally to the field of data archiving, and more specifically, to systems and methods for file archiving using machine learning.

BACKGROUND

In an increasingly common scenario, a user of a computer or server has to manage a large number of files, even though the user does not necessarily need access to all of the files at a given moment. At the same time, the storage devices of a computer or server, with which the user works directly, has a limited amount of resources (e.g., disk space). Some files have to be archived, which typically involves creating a backup of the files by copying the contents of the storage devices onto some other medium (such as another hard disk drive, a DVD ROM, a DVD RAM, a flash disk, tape drive, etc.) or, frequently, over a network (such as to a remote server or to a cloud storage service).

In some known approaches to data archiving, links to the archived files instead of the files themselves are placed on a front end storage server. If the user accesses these files, they are requested from the front end storage server and are provided to the user. The drawbacks to this procedure include significant delays and lost time, which are caused by network latency and time needed to search and extract archived files. These problems are especially acute in large corporations, which have a very large amount of data and a high number of users that work with this data.

SUMMARY

Thus, a system and method is disclosed herein for file archiving using machine learning. According to an exemplary aspect, a method is provided herein, comprising archiving a first file of a plurality of files from a storage server to a tiered storage system, training a machine learning module based on file access operations for the plurality of files, determining one or more rules for predicting access to the archived files using the machine learning module, determining a prediction of access of the archived file based on the one or more rules and retrieving the archived file from the tiered storage system into a file cache in the storage server based on the prediction of access.

According to another aspect, the method further comprises generating a reparse point in the storage server corresponding to the archived file, receiving, by a file system filter driver, a file request to access the archived file, determining a location of the archived file among the tiered storage system and the file cache based on the reparse point and retrieving data of the archived file from the determined location.

According to another aspect, the method further comprises receiving and servicing a file request to access the archived file from the file cache, wherein the archived file was retrieved from the tiered storage system and stored in the file cache prior to receiving the file request.

According to another aspect of the method, archiving the first file of the plurality of files from the storage server to the tiered storage system comprises scanning the plurality of files from the storage server to determine a demand prediction for each of the plurality of files and archiving the plurality of files including the first file to the tiered storage system based on the respective demand predictions.

According to another aspect, the method further comprises training the machine learning module based on the archival operations on the plurality of files, and archiving a second file of the plurality of files from the storage server to the tiered storage system based on the machine learning module.

According to another aspect of the method, the one or more rules predict access of the plurality of files based on archival operations and file access operations on the storage server.

According to another aspect, the method further comprises modifying or removing a rule from the one or more rules based on archival operations and file access operations on the storage server.

According to another aspect, the method further comprises maintaining a list of file placeholders on the storage server, wherein each file placeholder is a reference to a file in the tiered storage system.

According to another aspect of the method, the file placeholder is a reparse point.

An exemplary system disclosed herein comprises a hardware processor configured to archive a first file of a plurality of files from a storage server to a tiered storage system, train a machine learning module based on file access operations for the plurality of files, determine one or more rules for predicting access to the archived files using the machine learning module, determine a prediction of access of the archived file based on the one or more rules and retrieve the archived file from the tiered storage system into a file cache in the storage server based on the prediction of access.

A computer-readable medium, storing instructions thereon for file archiving using machine learning, the instructions comprising archiving a first file of a plurality of files from a storage server to a tiered storage system, training a machine learning module based on file access operations for the plurality of files, determining one or more rules for predicting access to the archived files using the machine learning module, determining a prediction of access of the archived file based on the one or more rules and retrieving the archived file from the tiered storage system into a file cache in the storage server based on the prediction of access.

The above simplified summary of example aspects serves to provide a basic understanding of the disclosure. This summary is not an extensive overview of all contemplated aspects, and is intended to neither identify key or critical elements of all aspects nor delineate the scope of any or all aspects of the disclosure. Its sole purpose is to present one or more aspects in a simplified form as a prelude to the more detailed description of the detailed description that follows. To the accomplishment of the foregoing, the one or more aspects of the disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for efficient file archiving using machine learning. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
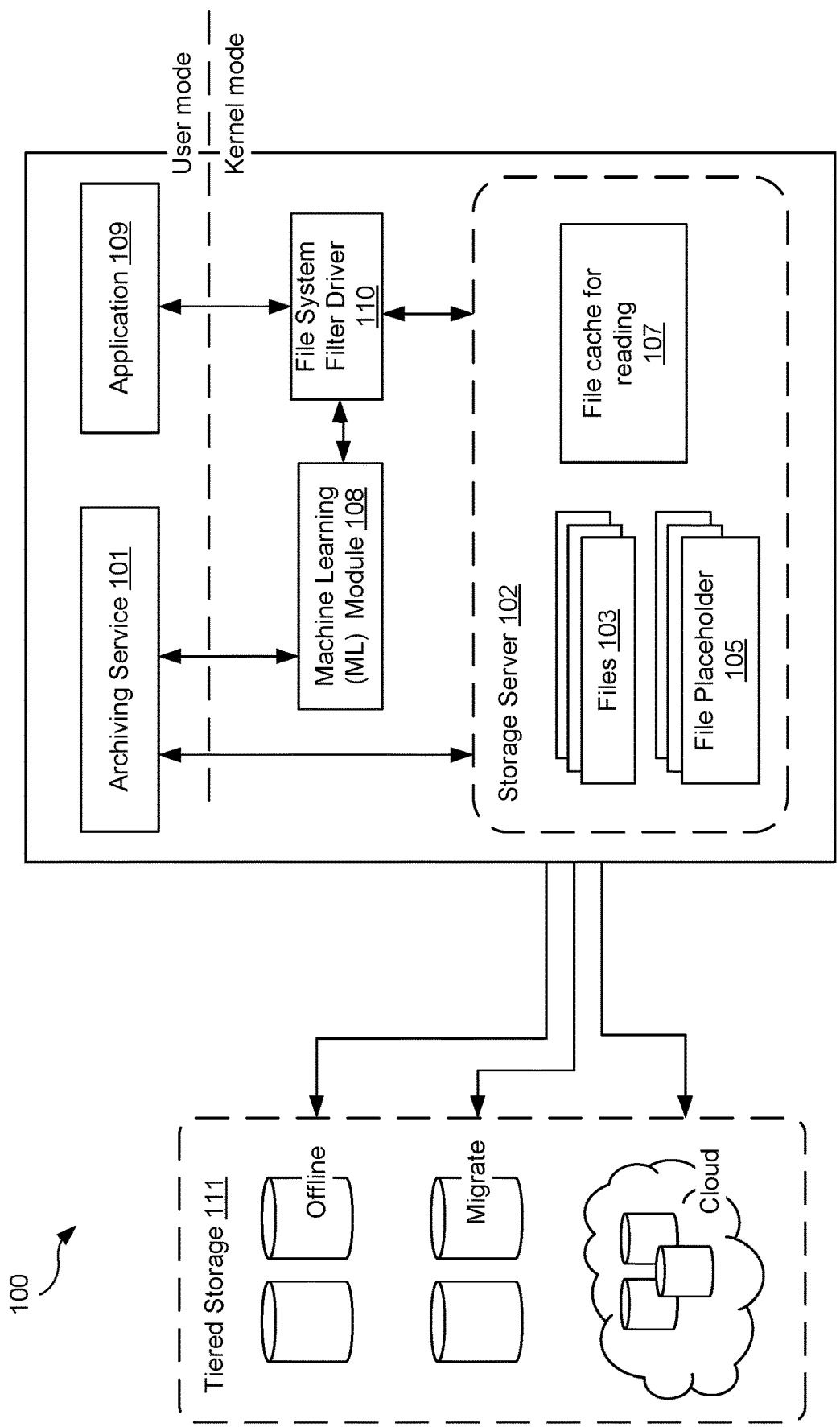
FIG. 1 is a block diagram illustrating a system for efficient file archiving using machine learning according to an exemplary aspect.

Exemplary aspects of the present disclosure use a machine learning system to optimize the hierarchical storage of files (i.e., storage tiers) for both archiving and for quick, predictive data extraction. FIG. 1 is a block diagram illustrating a system 100 for efficient file archiving using machine learning techniques according to an exemplary aspect. The system 100 includes an archiving service 101, a front-end storage server 102, a tiered storage system 111, a machine learning (ML) module 108, and a file system filter driver 110.

The front-end storage server 102 is configured to store one or more files 103 and one or more file placeholders 105, and includes a file cache for reading 107. According to one exemplary aspect, file placeholder 105 can be implemented as a reparse point. In an alternative embodiment, the placeholder is a file with an "Extended Attribute" in some systems. The archiving service 101 is configured to scan through files 103 stored on the storage server 102 and archives them onto the tiered storage system 111. The archiving service 101 may archive files onto the tiered storage system 111 depending on an initial prediction of how much demand is on each of the files. As the archiving service 101 moves files to the tiered storage system 111, the archiving service 101 replaces each file 103 with a corresponding file placeholder of the file placeholders 105 that is a reference or link to the actual file. The storage server 102 maintains a list of the file placeholders 105 that indicate the location of the data content within a particular tier in the tiered storage system 111 (e.g., whether it be in offline storage, cloud storage, etc.) Additionally, the list of file placeholders 105 is useful for retrieving an enumeration of placeholders. In some embodiments, a list of reparse points are built-in to an operating system, but the system may not support a list of "Extended Attributes". While "reparse points" may be terminology native to a MS-Windows®-based operating systems and filesystems (e.g., NTFS), it is understood that the aspects of the present disclosure may be adapted to other operating system and file system (e.g., MacOS®, Linux®, etc.)

The tiered storage system 111 is a system for the hierarchical storage of files that stores files in various types of logical or physical storage devices having different levels of cost, reliability, and performance. For example, the tiered storage system 111 may include a plurality of storage tiers such as a high reliability, high performance, and premium cost first tier that may be used for important data that is accessed often, and a lower performance, and less expensive second tier that may be used for archive data or other infrequently-accessed data. In one exemplary aspect, the archiving service 101 may place archived files in different tiers within the tiered storage system 111, such as a cloud computing storage service (e.g., infrastructure as a service, or "IaaS"), an offline storage device (e.g., tape storage device), or a migration to a different storage. According to one aspect of the present disclosure, the importance of a file is determined using metadata of the files being archived. Additionally, machine learning may be used, in one aspect, to learn the category of files and their respective storage tiers over time.

Accordingly, the machine learning module 108 is configured to track the operations performed on storage server 102 by both the archiving service 101 and the file system filter driver 110. Based on these tracked operations and historical data, the machine learning module 108 may generate one or more rules that determine the data tiering of files in the tiered storage system 111, i.e., which particular tier a given file should be stored in for improved performance and efficiency. In one aspect, the historical data may be provided to the ML Module 108 upon initialization of the system 100. The machine learning module 108 may also generate one or more rules that predict the likelihood that a file 103 archived in the tiered storage system 111 will be accessed by an application (e.g., application 109). Using these predictions, the described system 100 may retrieve a particular archived file in advance and place it in the file cache 107 prior to a file operation (e.g., read, write, modify) arriving from the file system filter driver 110 for that file 103. In one aspect, the ML module 108 may modify or remove rules that were previously generated by the ML module 108 as new data regarding the file information is received or changes. In another aspect, the ML module 108 may also modify or remove rules based on effectiveness of various rules for selecting a tier for a given file.

The file system filter driver 110 is configured to handle I/O operations from one or more applications, such as application 109, executing in the system 100. The I/O operations may include file operations to read data from a file 103 stored in the storage server 102, write data to a file, delete files, and other operations. The file system filter driver 110 may be a module component installed on an operating system, or an integrated part of a file system.

As described below, the system 100 includes two consecutive stages: (1) archiving of files; and (2) predictive extraction of those archived files. Each step may be optimized using the machine learning module 108.

Figure 2A:
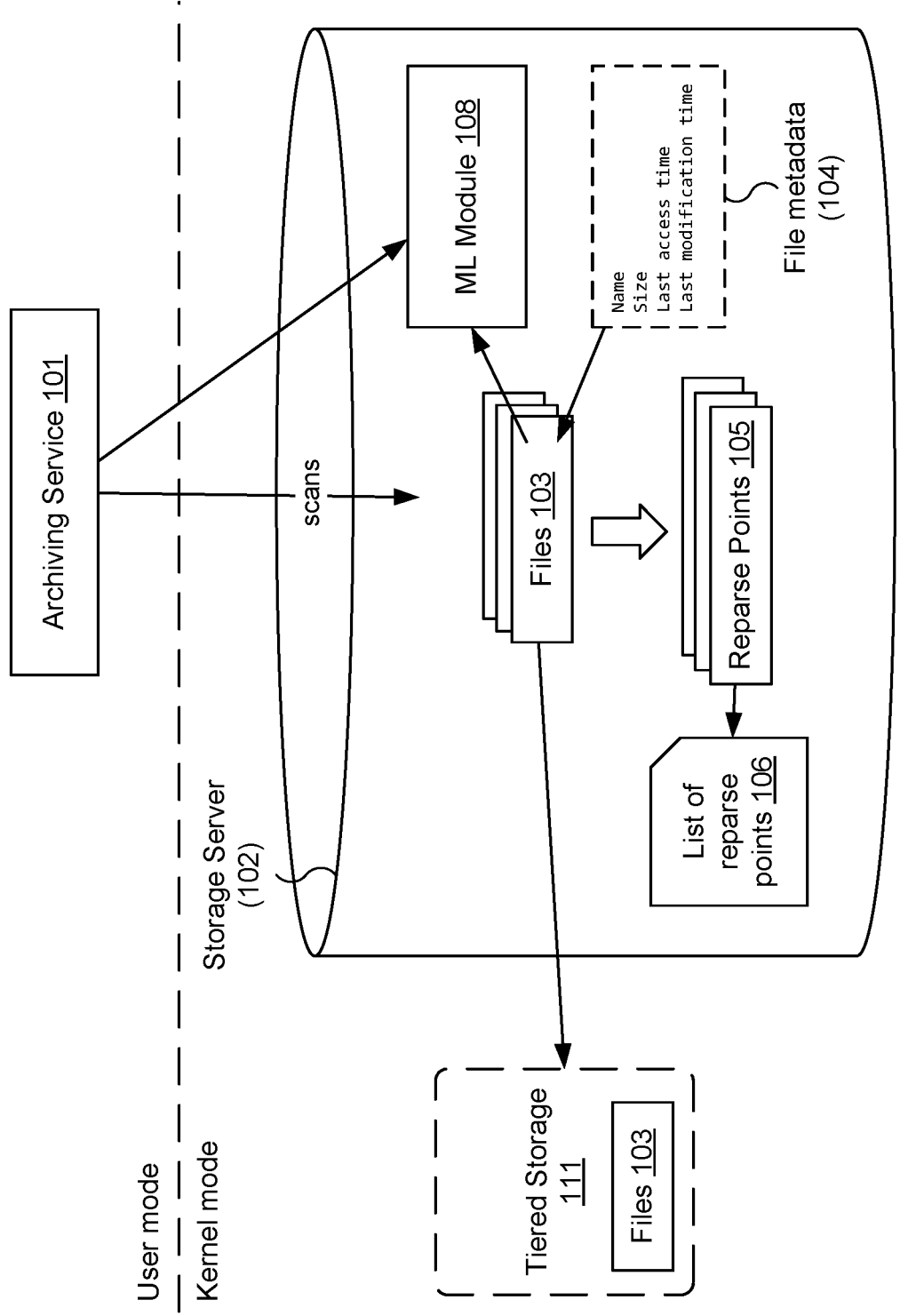
FIG. 2A is a block diagram illustrating example operations of a data archival stage according to an exemplary aspect.

FIG. 2A is a block diagram illustrating example operations of a data archival stage according to an exemplary aspect. During operation, the archiving service 101 scans the files 103 stored on the storage server 102 and archives them on the tiered storage system 111 depending on an (initial) prediction of how much demand there is for each of the files.

That is, a file predicted to have the least demand may be moved to a tier in the tiered storage system 111 having low cost and low performance specifications (e.g., tape drives), while a file predicted to have a comparatively higher demand might be archived to a tier that has high performance specifications (e.g., cloud storage). According to exemplary aspects, the number of tiers may be proportional to the number of discrete ranges of "demand" of files, from low demand storage tiers, to mid-level demand storage tiers, to high-demand storage tiers. In some aspects, files 103 may not be archived at all to tiered storage system 111 when the files 103 are above a demand threshold value (e.g., a value indicating how much demand there is for a file).

Information regarding demand can be generated based on file metadata 104 associated with the files 103, such as a file name, file size, a timestamp indicating the last time the file was accessed (i.e., last access time), a timestamp indicating the last time the file was modified (i.e., last modification time), file type, keywords associated with content of the files 103 and other suitable metadata. In some exemplary aspects, the machine learning module 108 provides the archiving service 101 with an initial prediction of a file's corresponding demand.

As described above, the files archived may be placed in different tiers within storage 111. For example, the files 103 can be archived in a cloud storage service, or in an offline storage facility, etc. In some aspects, a bandwidth limited, low cost cloud storage service may be where mid-tier demand files may be stored, while low-demand files, e.g. a demand lower than a predetermined threshold, may be stored at an offline storage facility. In an exemplary aspect, files in high demand, e.g., a demand greater than predetermined threshold, may be stored in high speed cloud storage or the like.

After archiving, the archiving service 101 replaces each of the original files 103 with a file placeholder 105 that references the corresponding original file. Each file placeholder 105 acts as a link or reference to a file of the real files 103. A user uses the file placeholders as ordinary files, however, the content of the files have been moved from the front-end storage server 102 to the different storage tiers within storage 111. The storage server 102 may maintain a list 106 of file placeholders that maps each of the file placeholders 105 to the location or tier of the corresponding original file 103 in storage 111.

The machine learning module 108 tracks all the operations regarding the archiving of the files and collects information that is later used for more precise or accurate data tiering. The volume of information collected by the machine learning module 108 continuously increases, which enables every new operation of data archiving to be performed more accurately.

Figure 2B:
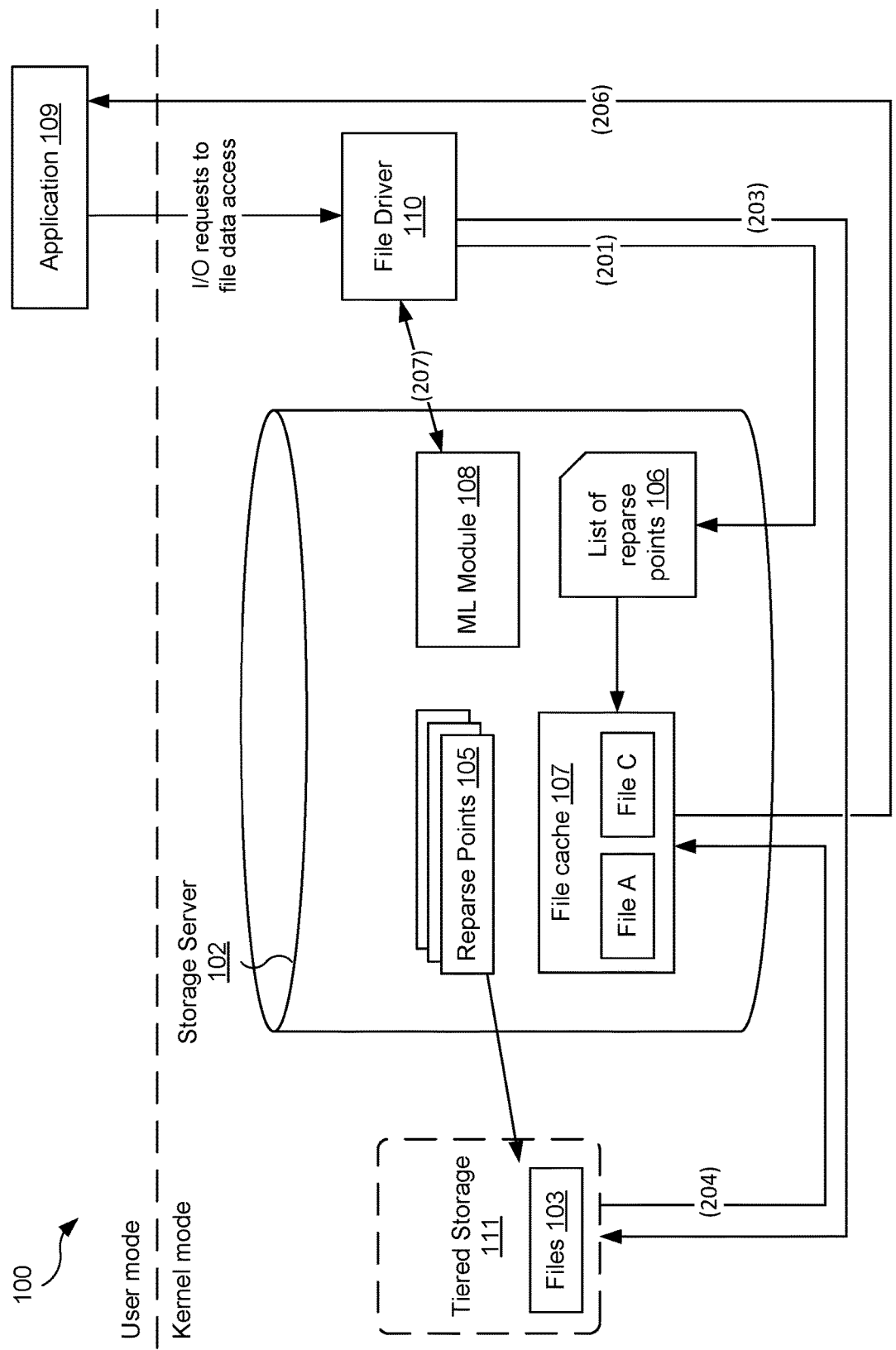
FIG. 2B is a block diagram illustrating example operations of a data extraction and retrieval stage according to an exemplary aspect.

FIG. 2B is a block diagram illustrating example operations of a data extraction and retrieval stage according to an exemplary aspect. During operation, an application 109 (e.g., executing in user space) sends a request to access one or more files in the storage server 102, but which are actually file placeholders 105.

The file system filter driver 110 checks the file availability on the storage server 102. The file system filter driver 110 accesses the list 106 of file placeholders and/or the metadata (reparse points or "Extended Attribute" data) of the placeholders and determines the tiering of the archived file in the tiered storage system 111 (operation 201). According to the access request, the file system filter driver 110 retrieves the file 103 from the tiered storage system 111 and provides the content of the file back to the application 109. The machine learning module 108 continuously tracks all the file access requests from any applications (e.g., application 109) or any user. In one aspect, the machine learning module 108 may be configured to continuously track all file access requests from a predetermined list of applications, or track all file access requests in a predetermined location on the file system.

According to these tracked operation, the machine learning module 108 generates rules, which can predict any possible file access requests from the user or applications. In one example, the machine learning module 108 may determine that User A opens file X every morning or User A opens a folder with photos. The ML module 108 may predict that after they open the first picture in this folder, the next picture in the folder will be opened as well, with a determined likelihood.

Based on these predictions received from the machine learning module 108, the file system filter driver 110 extracts certain files 103 from the tiered storage system 111 (operation 203) and places them into the file cache for reading 107 prior to the application 109 requesting these files (operation 204). Subsequently, if the application 109 does request these files at a later point in time (operation 206), access to these files is performed quickly and delays are reduced or eliminated, even though the files had been archived and stored in a remote storage (e.g., offline or on a cloud storage service, etc.) Continuing the above example, based on such a prediction, the file system filter driver 110 may extract the next pictures in the folder from the tiered storage system 111 and place them into the file cache 107 for subsequent retrieval.

Figure 3:
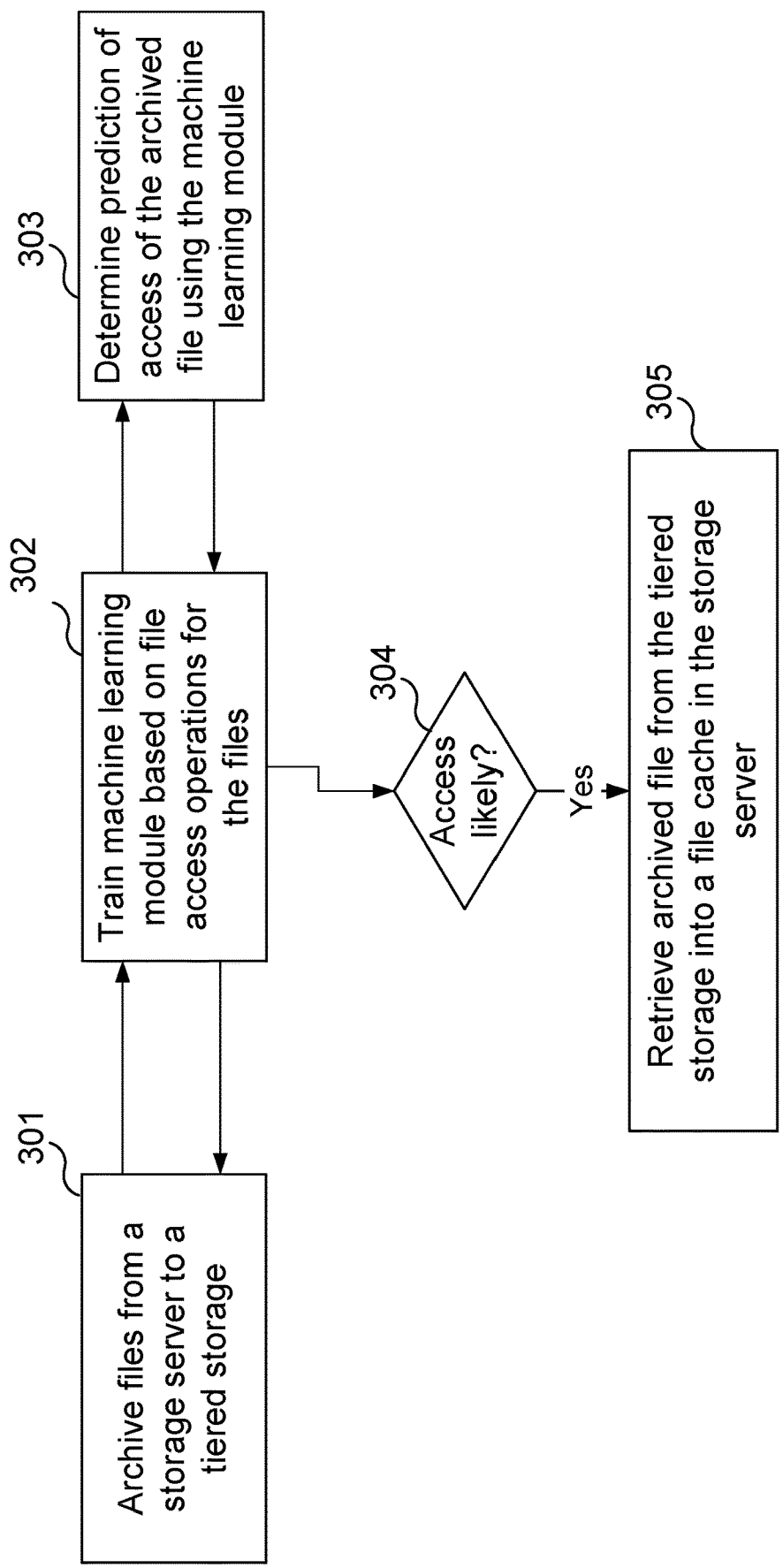
FIG. 3 is a flowchart illustrating a method for efficient file archiving using machine learning according to an exemplary aspect.

FIG. 3 is a flowchart illustrating a method 300 for efficient file archiving using machine learning according to an exemplary aspect. It is noted that the following description of the exemplary method makes reference to the system and components described above. In one aspect, steps 301, 302 and 303 are performed in parallel, executed in corresponding threads, and sharing information with one another.

At step 301, the archiving service 101 archives a first file of a plurality of files 103 from a storage server 102 to tiered storage system 111. In some exemplary aspects, the archiving service 101 generates a file placeholder 105 in the storage server 102 corresponding to the archived file. In some exemplary aspects, the archival operations include scanning the plurality of files 103 from the storage server 102 to determine a demand prediction for each of the plurality of files, and then archiving the plurality of files including the first file to the tiered storage system based on the respective demand predictions. In one aspect, At step 302, the machine learning module 108 is trained based on file access operations for the plurality of files. In some exemplary aspects, the machine learning module 108 is trained based on the archival operations on the plurality of files. The archiving service 101 may archive a second file of the plurality of files from the storage server to the tiered storage system based on the machine learning module 108.

At step 303, the machine learning module 108 determines a prediction of access of the archived file. In some exemplary aspects, the machine learning module 108 generates, modifies or removes one or more rules that predict access of the plurality of files based on archival operations and file access operations on the storage server.

According to one aspect, steps 301, 302 and 303 are executed in three separate threads and may interact with each other, or occur concurrently. For example, the archiving can occur using the trained model, as it is being trained. The model may be learned based on actual operations of access to the archived files. The prediction of access in step 303 may extract the data into cache based on the trained model.

At step 304, the machine learning module 108 determines whether the archived file is likely to be accessed based on one or more of historical access of the file, information relating to the file such as type information, importance and the like, as well as other properties of the client computer such as usage information, type of environment, information relating to the requesting application, or the like. If so, at step 305, the file system filter driver 110 retrieves the archived file from the tiered storage system into a file cache in the storage server based on the prediction of access.

At some subsequent time, the file system filter driver 110 may receive a file request (e.g., from an application 109) to access the archived file. The file system filter driver 110 may determine a location of the archived file among the tiered storage system and the file cache based on the file placeholder. The file system filter driver 110 may then retrieve data of the archived file from the determined location (e.g., from the file cache or from a certain tier in the tiered storage system). In some exemplary aspects, the file system filter driver 110 is able to receive and service a file request to access the archived file from the file cache, where the archived file was retrieved from the tiered storage system and stored in the file cache prior to receiving the file request.

Figure 4:
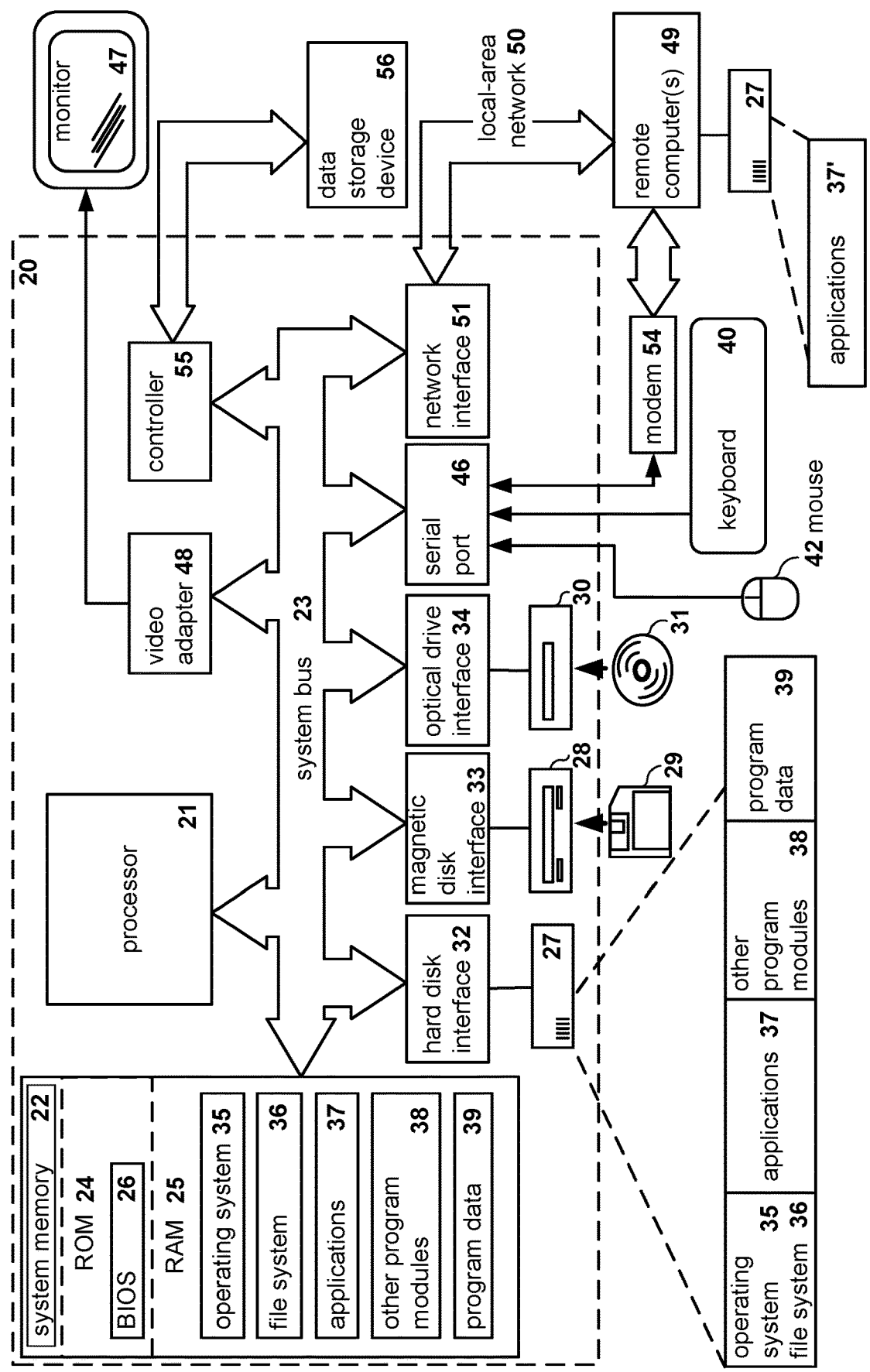
FIG. 4 is a block diagram of a general-purpose computer system on which the disclosed system and method can be implemented according to an exemplary aspect.

FIG. 4 is a block diagram illustrating a general-purpose computer system 20 on which aspects of systems and methods for scanning web pages may be implemented in accordance with an exemplary aspect. It should be noted that the computer system 20 can correspond to the system 100, storage server 102, or tiered storage system 111, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. . . . . . Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for file archiving using machine learning, comprising:
    archiving a first file of a plurality of files as an archived file from a storage server to a tiered storage system;
    generating a reparse point in the storage server corresponding to the archived first file;
    training a machine learning module based on file access operations for the plurality of files;
    determining one or more rules for predicting access to the archived first file using the machine learning module, wherein the one or more rules include a causal rule indicating that a likelihood that the first file will be accessed by a user of the storage server increases when the user accesses a second file at the storage server;
    determining a prediction of access of the archived first file based on the one or more rules, wherein determining the prediction of access comprises at least detecting user access of the second file at the storage server; and
    retrieving the archived first file from the tiered storage system into a file cache in the storage server based on the prediction of access;
    receiving, by a file system filter driver, a file request to access the archived first file;
    determining a location of the archived file among the tiered storage system and the file cache based on the reparse point; and
    retrieving data of the archived first file from the determined location.

2. The method of claim 1, further comprising:
    receiving and servicing a file request to access the archived first file from the file cache, wherein the archived first file was retrieved from the tiered storage system and stored in the file cache prior to receiving the file request.

3. The method of claim 1, wherein archiving the first file of the plurality of files from the storage server to the tiered storage system comprises:
    scanning the plurality of files from the storage server to determine a demand prediction for each of the plurality of files; and
    archiving the plurality of files including the first file to the tiered storage system based on the respective demand predictions.

4. The method of claim 3, further comprising:
    training the machine learning module based on archiving the plurality of files; and
    archiving the second file of the plurality of files from the storage server to the tiered storage system based on the machine learning module.

5. The method of claim 1, wherein the one or more rules predict access of the plurality of files based on archival operations and file access operations on the storage server.

6. The method of claim 1, further comprising:
    modifying or removing a rule from the one or more rules based on archival operations and file access operations on the storage server.

7. The method of claim 1, further comprising:
    maintaining a list of file placeholders on the storage server, wherein each file placeholder is a reference to a file in the tiered storage system.

8. The method of claim 7, wherein the file placeholder is the reparse point.

9. A system for file archiving using machine learning, comprising:
    a hardware processor configured to:
    archive a first file of a plurality of files as an archived file from a storage server to a tiered storage system;
    generate a reparse point in the storage server corresponding to the archived first file;
    train a machine learning module based on file access operations for the plurality of files;
    determine one or more rules for predicting access to the archived first file using the machine learning module, wherein the one or more rules include a causal rule indicating that a likelihood that the first file will be accessed by a user of the storage server increases when the user accesses a second file at the storage server;
    determine a prediction of access of the archived first file based on the one or more rules, wherein determining the prediction of access comprises at least detecting user access of the second file at the storage server; and
    retrieve the archived first file from the tiered storage system into a file cache in the storage server based on the prediction of access;
    receive, by a file system filter driver, a file request to access the archived first file;

determine a location of the archived file among the tiered storage system and the file cache based on the reparse point; and retrieve data of the archived first file from the determined location.

10. The system of claim 9, wherein the processor is further configured to:

receive and service a file request to access the archived first file from the file cache, wherein the archived first file was retrieved from the tiered storage system and stored in the file cache prior to receiving the file request.

11. The system of claim 9, wherein archiving the first file of the plurality of files from the storage server to the tiered storage system comprises:

scanning the plurality of files from the storage server to determine a demand prediction for each of the plurality of files; and archiving the plurality of files including the first file to the tiered storage system based on the respective demand predictions.

12. The system of claim 9, wherein the processor is further configured to:

train the machine learning module based on archiving the plurality of files; and archive the second file of the plurality of files from the storage server to the tiered storage system based on the machine learning module.

13. The system of claim 9, wherein the one or more rules predict access of the plurality of files based on archival operations and file access operations on the storage server.

14. The system of claim 9, wherein the processor is further configured to:

modify or removing a rule from the one or more rules based on archival operations and file access operations on the storage server.

15. The system of claim 9, wherein the processor is further configured to:

maintain a list of file placeholders on the storage server, wherein each file placeholder is a reference to a file in the tiered storage system.

16. The system of claim 15, wherein the file placeholder is the reparse point.

17. A computer-readable medium, storing instructions thereon for file archiving using machine learning, the instructions comprising:

archiving a first file of a plurality of files as an archived file from a storage server to a tiered storage system;

generating a reparse point in the storage server corresponding to the archived first file;

training a machine learning module based on file access operations for the plurality of files;

determining one or more rules for predicting access to the archived first file using the machine learning module, wherein the one or more rules include a causal rule indicating that a likelihood that the first file will be accessed by a user of the storage server increases when the user accesses a second file at the storage server;

determining a prediction of access of the archived first file based on the one or more rules, wherein determining the prediction of access comprises at least detecting user access of the second file at the storage server; and retrieving the archived first file from the tiered storage system into a file cache in the storage server based on the prediction of access;

receiving, by a file system filter driver, a file request to access the archived first file;

determining a location of the archived file among the tiered storage system and the file cache based on the reparse point; and retrieving data of the archived first file from the determined location.

* * * * *